(12) United States Patent
Lee et al.

(10) Patent No.: US 8,638,778 B2
(45) Date of Patent: Jan. 28, 2014

(54) PERFORMANCE MEASUREMENT IN A NETWORK SUPPORTING MULTIPROTOCOL LABEL SWITCHING (MPLS)

(75) Inventors: Kwok Keung Lee, Plano, TX (US); Hsiang Ann Chen, Austin, TX (US); Jason Xiaoguang Chen, San Jose, CA (US); Rakesh Kumar, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 736 days.

(21) Appl. No.: 12/557,803

(22) Filed: Sep. 11, 2009

(65) Prior Publication Data

US 2011/0063988 A1 Mar. 17, 2011

(51) Int. Cl.
*H04L 12/28* (2006.01)

(52) U.S. Cl.
USPC .......................................... 370/351

(58) Field of Classification Search
USPC .......................................... 370/241
See application file for complete search history.

(56) References Cited

U.S. PATENT DOCUMENTS

| 5,649,108 | A | 7/1997 | Spiegel et al. | |
|---|---|---|---|---|
| 6,363,053 | B1* | 3/2002 | Schuster et al. | 370/230 |
| 7,366,176 | B1 | 4/2008 | Sundaresan et al. | |
| 2005/0073961 | A1* | 4/2005 | Paik et al. | 370/252 |
| 2005/0169188 | A1* | 8/2005 | Cometto et al. | 370/249 |
| 2008/0008178 | A1* | 1/2008 | Tychon et al. | 370/392 |

* cited by examiner

*Primary Examiner* — Mark Rinehart
*Assistant Examiner* — Maharishi Khirodhar
(74) *Attorney, Agent, or Firm* — Schwegman Lundberg & Woessner, P.A.

(57) ABSTRACT

A method and apparatus to provide hop-by-hop tracking for a communication network is described. In one embodiment, a router verifies that a next downstream router supports tracking and in response, adds a tracking indicator and a timestamp to the data packet. An end router provides a compilation of all the timestamps back to the originating router.

20 Claims, 11 Drawing Sheets

PERFORMANCE MEASUREMENT IN A NETWORK SUPPORTING MULTIPROTOCOL LABEL SWITCHING (MPLS)

FIELD

The present disclosure relates generally to computer networks. In an example embodiment, the disclosure relates to performance measurement in a network supporting multiprotocol label switching.

BACKGROUND

Various criteria are used in evaluating performance of a communication network. Services provided over such networks are defined by a Service Level Agreement (SLA) relating to these criteria. For example, an SLA may define acceptable levels of jitter or latency for communications. The criteria may be defined or specified for a given transmission path, such as a Label Switched Path (LSP). Measurements of communication path performance provide the data and information to evaluate the communication network performance for conformance to the SLA. As service provider revenue is based on this performance of the communication, various measurements and methods for measurement of communication path performance have been developed depending on the service, SLA and application. Typically, these measurements monitor routine performance of the network, such as performance of communication paths traversing the network, and may also be used when services degrade.

BRIEF DESCRIPTION OF THE DRAWINGS

Some embodiments are illustrated by way of example and not limitation in the figures of the accompanying drawings in which.

DESCRIPTION OF EXAMPLE EMBODIMENTS

Figure 1:
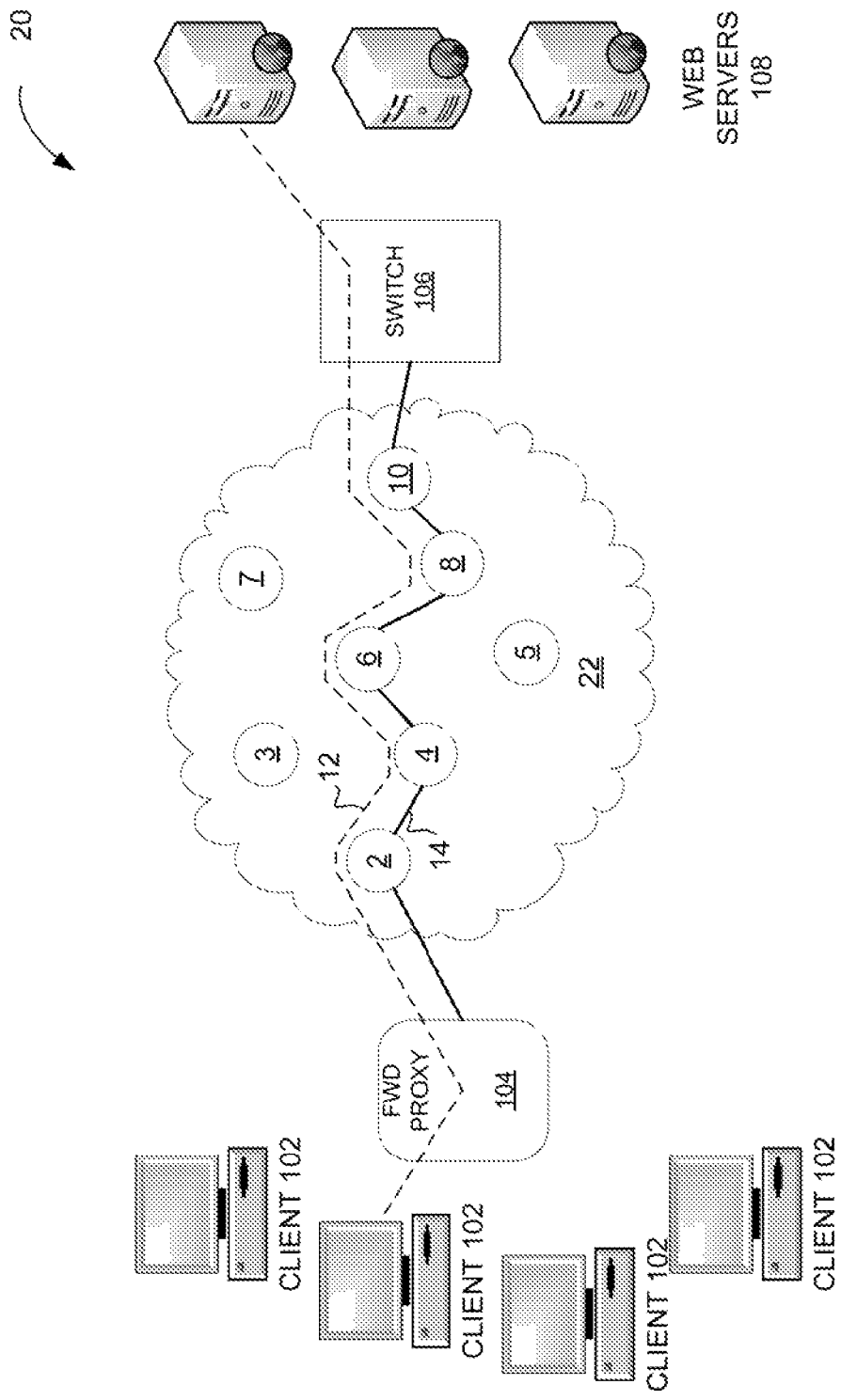
FIG. 1 and FIG. 2 are block diagrams illustrating a Multi-Protocol Label Switching (MPLS) network, according to an example embodiment.

In the following description, for purposes of explanation, numerous specific details are set forth in order to provide a thorough understanding of an example embodiment of the present disclosure. It will be evident, however, to one skilled in the art that the present disclosure may be practiced without these specific details.

Overview

A computer implemented method and apparatus for performance measurement in a network supporting multiprotocol label switching is described. The method may comprise receiving a data payload at a router and, using at least one digital processing unit, identifying the data payload for hop-by-hop tracking. A tracking indicator for the data payload may then be created and the tracking indicator may then be added to the data payload to form a data packet. The data packet may then be transmitted to a next router.

Example Embodiments

Communication networks may specify the quality of transmissions, such as delay, latency, jitter, or other criteria that describe the transmissions. A challenge for traditional MPLS networks is to collect SLA data for an MPLS LSP. Such measurements are used to evaluate the service provider's backbone network, as often service is provided or sold to customers with pricing based on the specifics of the SLAs. When these services degrade, the service provider troubleshoots to isolate issues. Once identified, the service provider may address issues and restore service as specified by the SLA.

Measurement techniques may implement a form of timestamping to measure traffic on the MPLS LSP. The timestamp may be applied in the control plane or in the data plane. The control plane refers to the anticipated or expected routing of data or traffic through the MPLS network; the data plane refers to the actual path taken through the network. Applying timestamps in the control plane effectively measures the time for traffic to traverse the network from end-to-end. Measurement is made at the start and end points of a given MPLS LSP. These control plane measurement techniques assume that the traffic traveled on the anticipated route. Control plane measurements are easy to implement and reduce computing time and overhead.

It is possible, and often the case, that the traffic takes a route through the MPLS network that is different from the anticipated path. Some embodiments of the present invention, therefore, apply timestamps in the data plane. These data plane measurement techniques do not assume the traffic traveled the anticipated route, but rather collect timestamps at nodes along the route. The data plane techniques allow accurate measurements in order to satisfy Quality of Service (Quality of Service) requirements, where the added information and measurement accuracy is used to analyze and schedule communications. As the MPLS LSP may span a large network, the service provider desires information on specific fault points.

Data plane measurement techniques may be implemented in a variety of ways. In an example embodiment, a tracking method collects timestamps, hop-by-hop from an originating point to an end-point the network. Timestamps indicate data traffic through the network. In one embodiment, a tracking indicator may be a label for a Forward Equivalency Class (FEC), such as "timestamp FEC." Some embodiments provide a mechanism in the data plane to identify which packets to timestamp, and describing formats and places within a data packet to place the timestamp. Once the timestamp information is available, there are multiple ways to analyze the information, which may be determined by the system components, the system configuration, the service provider specifications, the service offered, the service consumer specifications, as well as a variety of other variables.

FIG. 1 illustrates a communication network 20, including an MPLS network 22. Accessing the MPLS network 22 are multiple client machines 102. A client machine 102 may also be referred to as Customer Edge (CE), which is a last customer switch or router before entering the MPLS network 22. Client machine 102 may be the router that allows a path for the user to the provider network. Information is provided to a target forward proxy 104, also referred to as a Provider Edge (PE). The MPLS network 22 is further communicatively coupled to a switch 106 for communication with web servers 108 or other computer systems. The communicative connections and coupling illustrated in FIG. 1 may be implemented in a variety of ways. Further, there may be additional components implemented within the network while facilitating the communicative paths illustrated. The client machines 102 may include any data processing device having capability to participate in a data communication.

The forward proxy 104 is where user routed information is received and forwarded to the MPLS network 22. The forward proxy creates labels for communication information or traffic. In MPLS technology, a label is information provided with the transmission information packet that helps move the transmission information packet, such as data in frames, from point to point in the network. Each movement from one point to a next is considered a hop. In this way, the MPLS network is a layered communication technology that defines information movement on a hop-by-hop level. The label in MPLS is included in a field of information referred to as a "shim header." The shim header is provided between a layer 1 header and a layer 3 payload. The shim header may provide sufficient information to define a path through a network, and not just to the next hop. The shim header includes subfields, one of which is the label. The label stored in the shim header is identified by a label value. A label may refer to a specific function or label operation; similarly, a label may refer to a custom function.

Continuing with FIG. 1, the forward proxy 104 is coupled with the MPLS network 22 made up of multiple Label Switch Routers (LSRs), or nodes, 2, 4, 6, 8 and 10. An LSR is any router or switch to perform label switching by receiving a labeled packet and "swapping" the label of the packet with an outgoing label. The LSR then forwards the new labeled packet from the appropriate interface. The source of a packet is referred to as the ingress point or ingress LSR. The ingress LSR puts the label in to the packet, which is referred to as label imposition. The ingress LSR then forwards the packet through the MPLS network, such as MPLS network 22, or MPLS enabled domain.

The destination of a packet is referred to as an egress point or egress LSR. This is the destination or exit point of traffic after traveling through an MPLS network. The egress LSR removes the label from the packet, which is referred to as label disposition. The egress LSR then forwards the packet from the MPLS network to the destination.

Also illustrated in FIG. 1 there is a first path 12 designated by a dashed line from the forward proxy 104 to the switch 106. The first path 12 identifies an anticipated path or expected path for the data packet to travel in traversing the network 22. In this case, the forward proxy 104 is an ingress LSR and the switch 106 is an egress LSR. The first path 12 is the projected hop-by-hop path for communications from forward proxy 104 through MPLS network 22 to switch 106. The hop-by-hop path of the first path 12 is node 2 to node 4 to node 6 to node 8 to node 10 to switch 106. The network 22 also includes multiple other nodes, including node 3, node 5 and node 7, which are not involved in the transmission path illustrated in FIG. 1. The first path 12 is the path expected to be the most efficient. In practice, however, the actual hop-by-hop path for a given communication may take another route. This may be due to traffic concerns, trouble with a router, or other considerations. The actual communication transmission path is the second path 14 identified by a solid line. In this case, the first path 12 and second path 14 are consistent. In other words, the order of LSRs from the forward proxy 104 through MPLS network 22 to switch 106 is the same. This is not always the case, and the second path 14 may take a different route.

Conventional methods for evaluating the performance of a communication path consider the end-to-end delay. Such method compares a timestamp at the ingress LSR and a timestamp at the egress LSR. Using on one of these conventional methods, there may be significant difference in the actual processing time versus the anticipated processing time. For example, the second path 14 may include LSRs not included in the first path 12. In this scenario, the delay from hop-by-hop may be within the allowable specification; however, end-to-end calculation based on the anticipated first path 12 will result in an inaccurate report.

Further, there is no standard mechanism in MPLS networks to collect timestamps at every hop as measurement is done in the control plane at the end of the LSP. This is not accurate and provides little information as to identification of a fault point. When the MPLS network, such as MPLS network 22, spans a large number of routers, identification of a fault point becomes difficult. It is therefore desirable to identify timestamps per each hop of the second path. This provides an accurate evaluation of the communication processing as it maintains measurements in the data plane. Further, this method does not require deep packet inspection and may be implemented in the data plane by recognizing a "timestamp" label. In this way, a method to monitor the path following an MPLS LSP accurately follows the actual data path and may be used to identify a fault point.

One embodiment provides a method to collect timestamps across the MPLS path, or LSP, on a hop-by-hop basis from start to end. The monitored information may then be used to determine the point(s) of congestion in the path of the given MPLS LSP. In this embodiment, a new label is introduced to identify a timestamp used for hop-by-hop monitoring. The label is referred to as the Forward Equivalency Class (FEC) label or "timestamp FEC." The FEC label is negotiated across the MPLS network. An MPLS router or LSR implements the timestamp FEC and advertises the FEC timestamp capability by providing the timestamp label to the upstream MPLS router through signaling at the system startup time.

Figure 2:
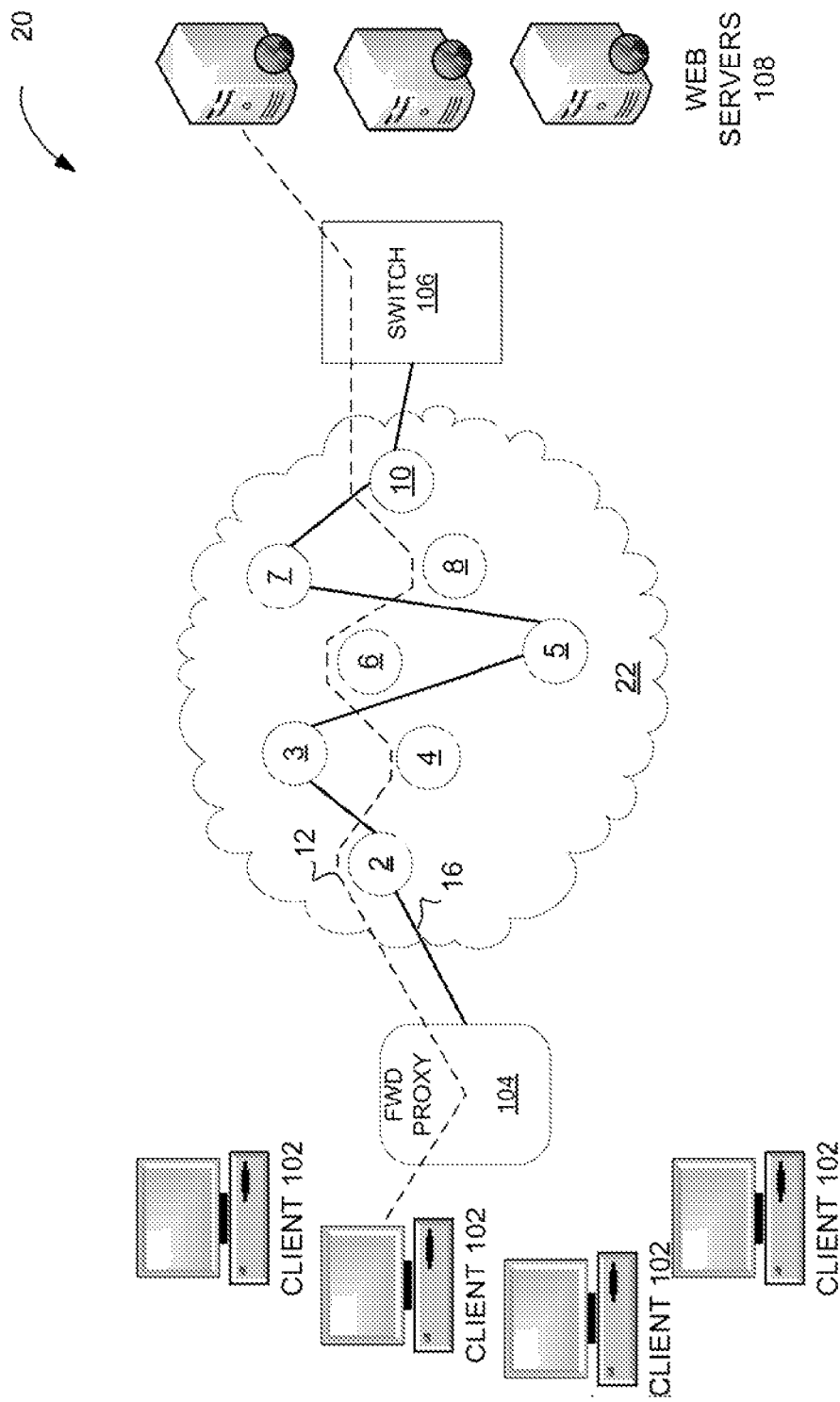

FIG. 2 illustrates the MPLS network 22 implementing a timestamp FEC method of communication. The first path 12 (dashed line) is identified by hop-by-hop path of node 2 to node 4 to node 6 to node 8 to node 10. The second path 16 (solid line) is identified by hop-by-hop path of node 2 to node 3 to node 5 to node 7 to node 10 to switch 106. Monitoring performance of a communication path is possible using the timestamp FEC capability of the LSRs within the MPLS network 22. Each router having timestamp FEC capability initiates a timestamp collection request for a target router or next hop. The process checks whether the next router downstream supports this capability.

For example, when the forward proxy 104 is timestamp FEC capable, the forward proxy 104 will verify that the next hop, node 2, is capable of providing a timestamp. When node 2 supports timestamp FEC capability, then forward proxy 104 will impose the timestamp label and send the packet to the downstream router, node 2. The downstream router, node 2, receives the packet with the top label being a timestamp label. In response, node 2 applies a timestamp to the packet. The node 2 then processes the packet in the control plane, which will add timestamp to the packet in a Type-Length-Value (TLV) encoding scheme. The node 2 then identifies a next hop based on the label below the timestamp label. The node 2 inserts the timestamp label for the next downstream router. When the next router is timestamp FEC capable, the process starts again at that router. The process continues to an end LSR, whereupon the last LSR in the LSP receives a compilation of the timestamp information from each hop and then sends this collected timestamp information to the initiating router. The end point is determined when the received packet does not have a next identified hop but comes simply with the timestamp label.

When the next hop downstream router does not support timestamp FEC capability then the timestamp information is communicated to the initiating router with the timestamp information collected to the last supporting hop. Alternate embodiments may include methods for conveying the timestamp information through those LSR which do not support the timestamp FEC. In such embodiments, the information is passed through in case other downstream LSRs support timestamp FEC, and allowance is made for the non-supporting routers.

Alternate embodiments may implement the timestamp FEC methods in a control plane by handling the timestamp label, while other embodiments implement the processing in the hardware data path. Timestamp mechanisms may be implemented in the control plane or the data plane; however, the data plane allows a level of accuracy not available in the control plane measurements. In each of these embodiments, a timestamp label is used to trigger the collection of timestamp information on an MPLS path. The timestamp information is used to monitor SLA performance of a given MPLS path. The addition of a timestamp label is used as there is currently no standard mechanism for MPLS networks to collect timestamps at every hop.

Figure 3:
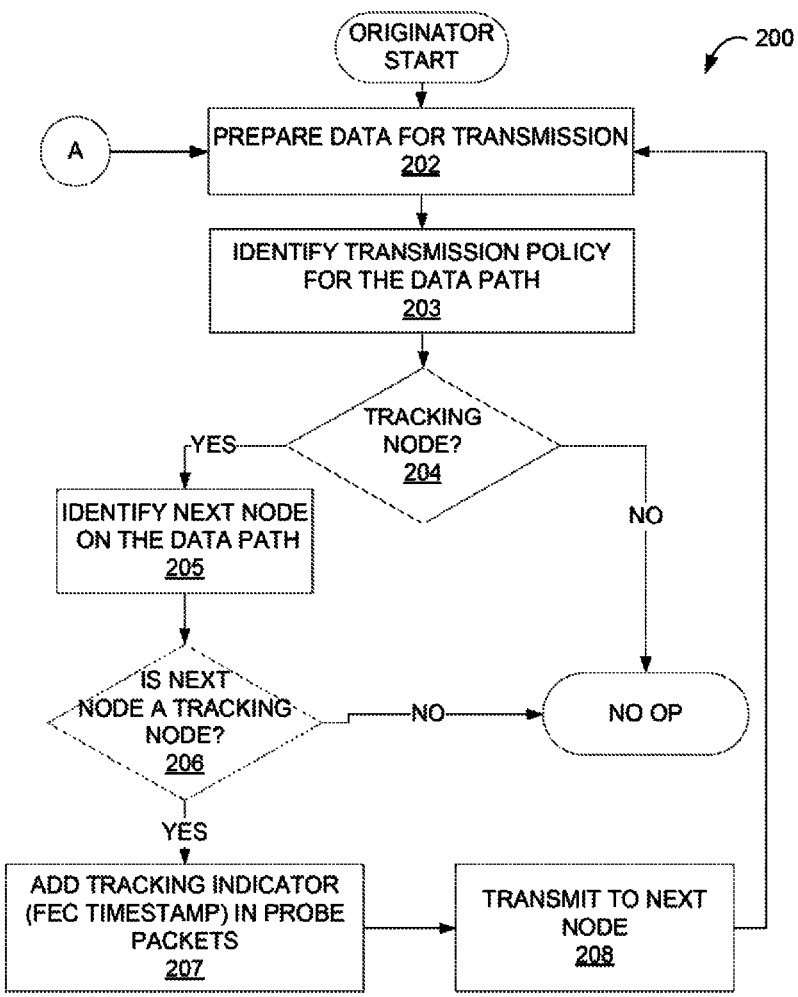
FIG. 3 is a flow diagram illustrating a process for measuring performance of a communication path in a network supporting MPLS and tracking, according to an example embodiment.

FIG. 3 is a flow diagram illustrating timestamp FEC processing for monitoring the communications in the MPLS network 22. The method 200 is performed by an originator and starts when a network node prepares 202 data for transmission. The method 200 then identifies 203 the transmission policy for the data path. The transmission policy may identify parameters of a service, such as specified in the SLA, which are to be monitored for transmissions in the network 22. For example, according to one transmission policy, jitter is to be maintained within a specified range of values. In another example, the latency, or delay, of transmissions is to be less than a specified value. The method 200 then includes activities to determine 204 if the network node is a tracking node. In other words, the method 200 will determine if the node supports the tracking method. For a tracking node, the method 200 continues to identify 205 a next node in the data path and adds 207 a tracking indicator to the data packet. Processing continues to transmit 208 the packet to the next node. If the node does not support tracking, then processing is terminated, and the node performs no operation, or a NO OP, with respect to the tacking technique.

Optionally, the method 200 may also include activities to determine 206 if the next node is a tracking node. If the next node is not a tracking node, the processing terminated, and performs no operation with respect to the tacking technique. The originator node may also be capable to process communications without using the tracking technique(s) described herein. If the next node is a tracking node, then processing continues to add the tracking indicator 207. Various decisions are possible at each hop based on the various determinations, including revising the transmission path to direct a communication through tracking nodes. In one embodiment, the tracking indicator and timestamp information are ignored by non-tracking nodes, wherein the non-tracking nodes remain able to transmit the data packet. In an alternate embodiment, the data transmission terminates when a non-tracking node is encountered.

Various embodiments implement a tracking method to work with legacy systems, where the tracking method is designed to be consistent with non-tracking nodes, and non-tracking nodes are able to process the data packets without removing the tracking indicator or timestamp information.

Determining 204 if a node is a tracking node typically involves identification of a tracking indicator in the envelope of the data packet. Where the node is an initiating node, such as the first node in the transmission path, the node processes data packets to apply the tracking indicator and to add a timestamp to the data packet. Additionally, the network may maintain information identifying tracking nodes within the network. In this way, each node is able to access information as to whether the next node in a transmission data path is a tracking node or a non-tracking node.

The tracking methods involve application of a tracking indicator, which is applied by an initiating tracking node to data packets for transmission. The tracking criteria indicates that the next router supports timestamp FEC, and therefore the timestamp FEC processing will be used. In such an example, the timestamp FEC information is added to the data packet, such as to probe packets, and the next node receives the timestamp and understands how to handle the packet.

The tracking indicator may be applied to a portion of the data packets of a transmission, such as to probe packets that may be provided periodically or randomly according to a predetermined scheme. In one example, the probe packet is selected as each packet for transmission. For data packets without the tracking indicator, processing continues to transmit 208 the packet.

Figure 4:
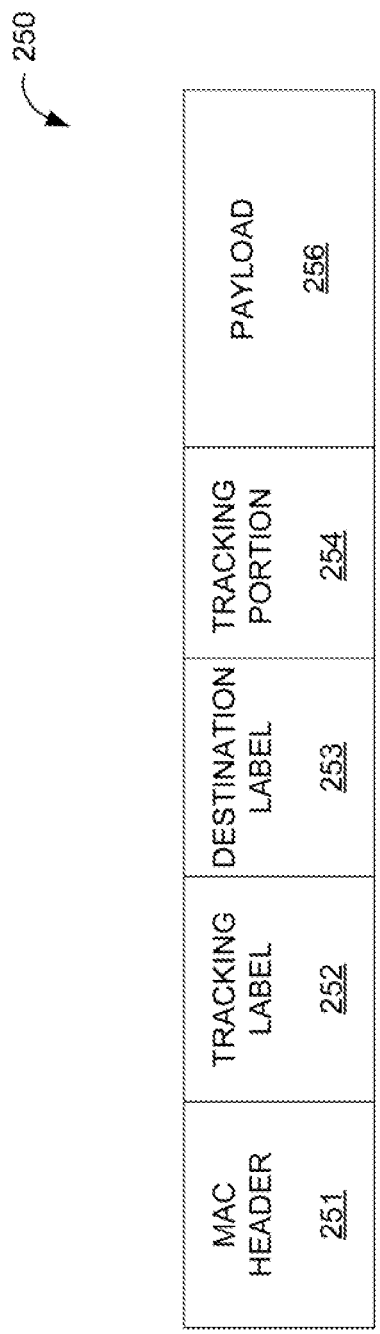
FIG. 4 is a block diagram illustrating a tracking message, according to an example embodiment.

The tracking indicator of one embodiment is illustrated in FIG. 4. The data packet 250 is made up of several fields, including a Medium Access Control (MAC) header 251, a tracking label 252 as the tracking indicator, a destination label 253, a tracking portion 254, and a payload 256. The MAC protocol is used to provide the data link layer in a networked communication. The MAC protocol encapsulates the payload 256 through the use of the MAC header 251. Alternate embodiments may employ different combinations of tracking information. The tracking label 252 provides the tracking indicator, which is an indication to the recipient of the data packet 250 that a tracking method is being used with the data packet 250. In the illustrated embodiment, the tracking label 252 is a code as a command or instruction for the receiving router to use the timestamp FEC processing. Where a variety of tracking mechanisms are possible, the tracking indicator may indicate which scheme is being used, or may be a simple one bit indication that tracking is used. The tracking portion 254 is used to store tracking information, such as a timestamp for the current node indicating a time associated with processing of the data packet 250 at the current node. When a tracking node receives the data packet 250 having the tracking label 252 and the tracking portion 254, the receiving tracking node continues a cumulative process of adding tracking information, such as timestamp information, to the tracking portion 254, and in this way, transforms the received data packet into a new data packet, as illustrated by way of example in FIG. 8.

Figure 5:
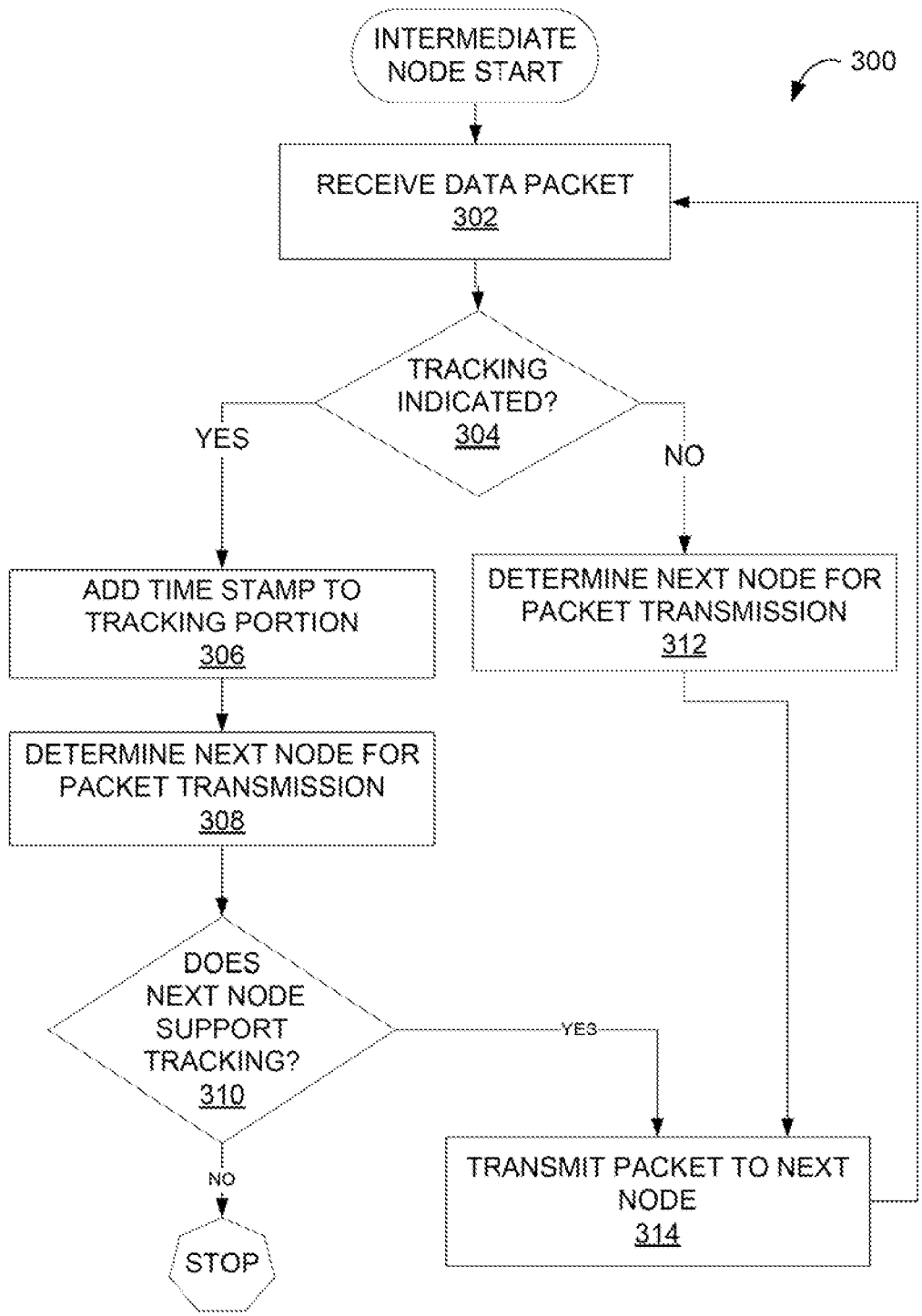
FIG. 5 and FIG. 6 are flow diagrams illustrating criteria tracking in a communication network, according to an example embodiment.

FIG. 5 illustrates a method 300 for a receiving node upon receipt of the data packet 250, which includes tracking label 252, which in this embodiment is a timestamp FEC indicator. The flow chart of FIG. 5 refers to processing done at the initial node, such as a router, in the network 22 as in FIG. 2. In the present example, the initiating node may be forward proxy 104 or node 2 as in FIG. 2. The tracking node receives 302 the data packet 250. When tracking is indicated 304, a timestamp is added 306 to the tracking portion 254, as illustrated in FIG. 4. In the present embodiment, the tracking portion 254 includes the initiating timestamp, added by the initiating node, as well as the timestamps of any previous nodes (e.g. upstream routers). The node then determines 308 the next node for transmission of the data packet 250, and determines 310 whether the next node supports the tracking method, which in this embodiment is timestamp FEC tracking. When the next node supports the tracking method, the data packet 250 is transmitted 314 to the next node. At this point, processing may continue with the next node ignoring the tracking label 252 and the tracking portion 254, or processing may terminate as the entire transmission data path does not support the tracking method. If the processing terminates, the current node may send the tracking information compiled to this point back to the initiating node to present to the originator of the data packet 250 transmission. Still further, the processing may continue to the next node, where each tracking node along the transmission data path adds timestamp information while the non-tracking nodes process without implementing the tracking method.

Note that the nodes of the network may also process communications for which tracking is not desired. In this case, when the current node determines 304 that tracking is not indicated, the node determines 312 a next node for packet transmission and transmits 314 the packet to the next node. Therefore, tracking nodes may be able to process transmissions incorporating tracking as well as transmissions without tracking.

Figure 6:
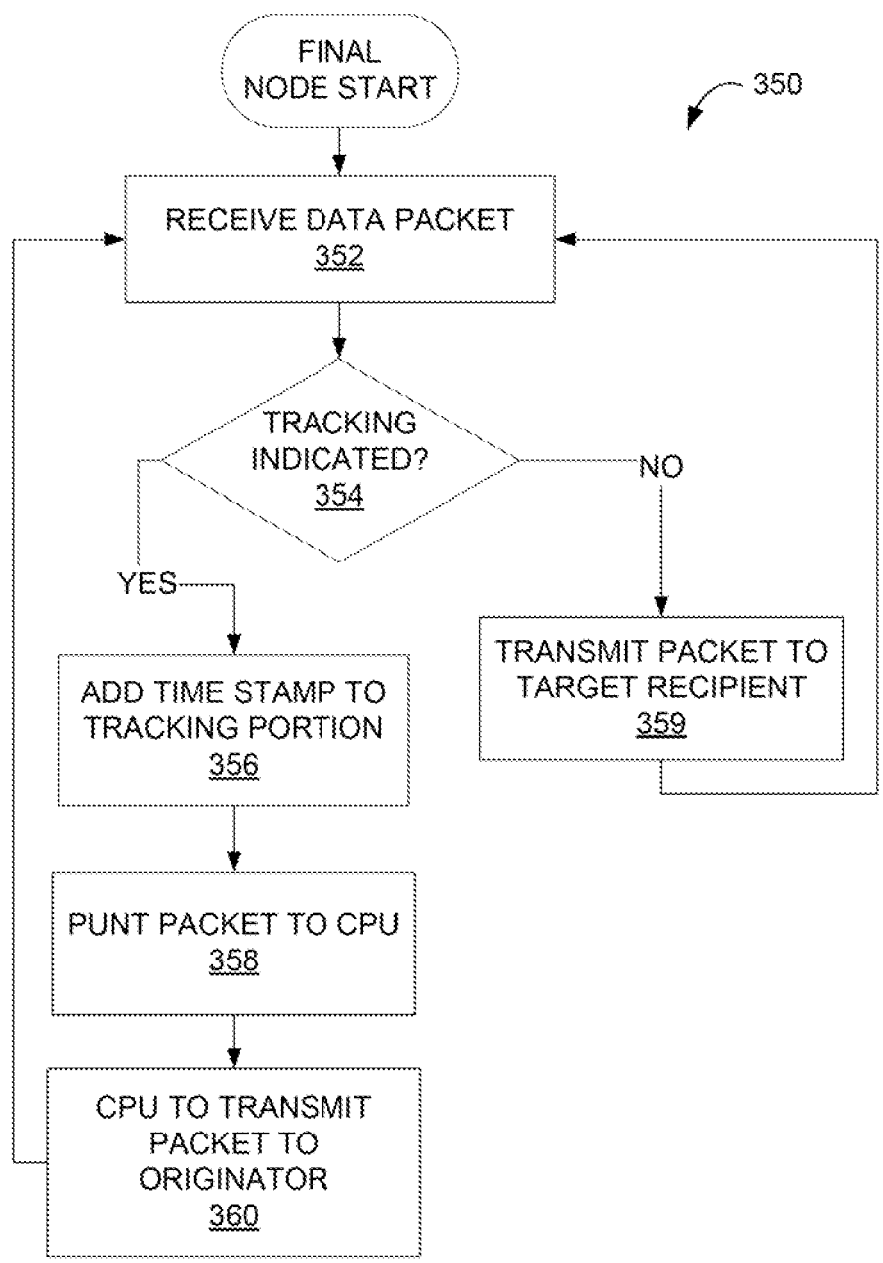

FIG. 6 illustrates a process 350 performed by the final or end node, to track the data packet 250. As discussed above with respect to the flow chart of FIG. 5, the initial node for the transmission through the MPLS network 22 was forward proxy 104 or node 2. Similarly, the final or end node in the MPLS network 22 for the transmission data path is node 10 or switch 106. The final node terminates the transmission of the data packet 250 through the network. In this way, the final node receives 352 the data packet 250, which includes the compilation of timestamps for each tracking node on the transmission data path. The data packet 250 also includes the tracking label 252. When the router determines 354 that tracking is indicated, such as is the case in this example, processing continues to add 356 the timestamp for the current node to the tracking portion 254 of the data packet 250. Processing then continues to transmit 358 the data packet 250 to the target recipient. Additionally, the node also transmits 360 a copy of the data packet 250 to the initiating router or originator. The information sent to the originator provides the full tracking information to describe transmission of the data packet 250 on a hop-by-hop basis. The information in the present example provides time measures for each transmission hop and enables the originator to identify a fault or delay in the network.

If the end node receives 352 a data packet that does not indicate 354 tracking, such as where there is no tracking indicator similar to tracking label 254, the node continues to transmit 359 the packet to the target recipient.

Figure 7:
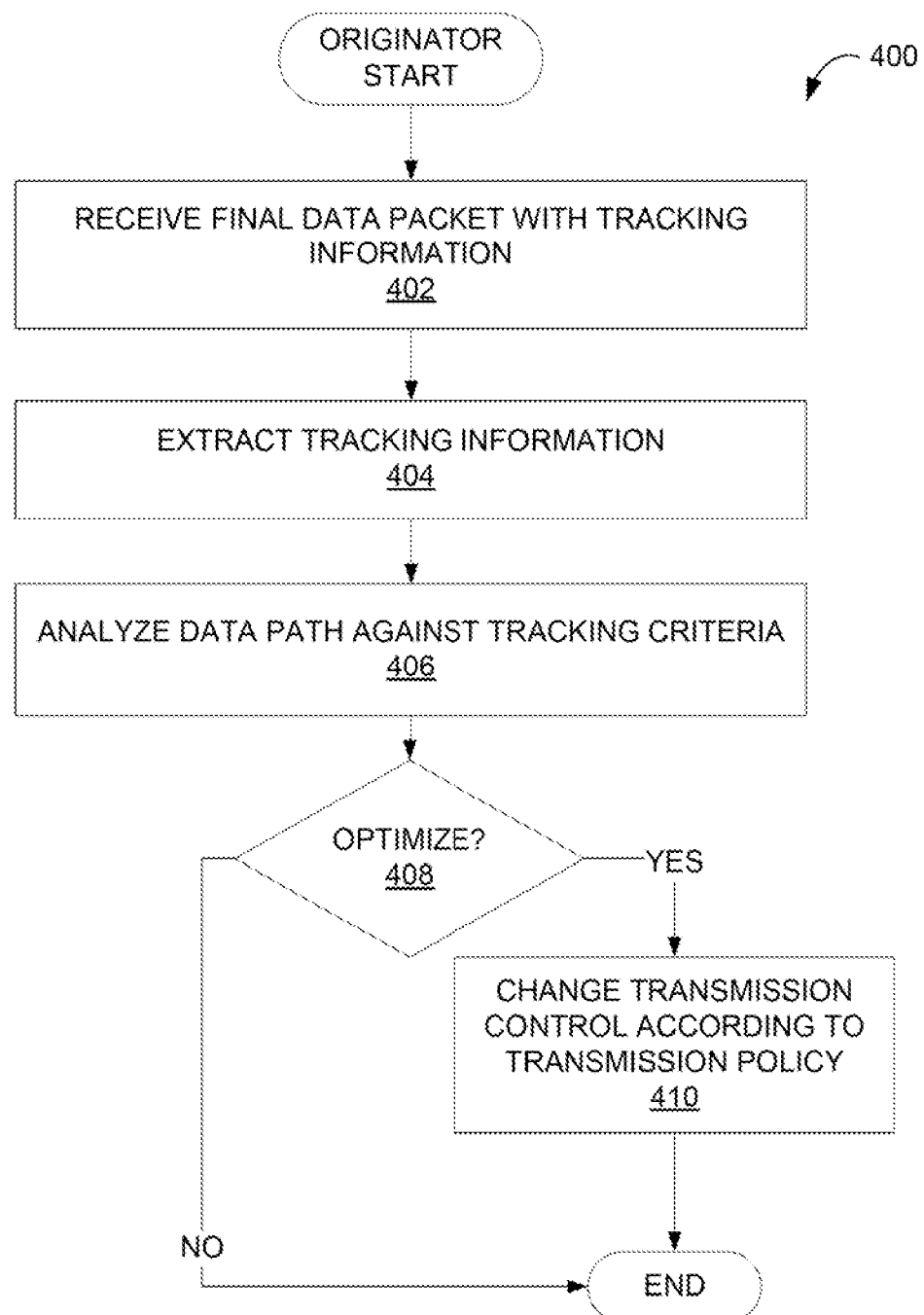
FIG. 7 is a flow diagram illustrating processing of tracking information by an originating node, according to an example embodiment.

As indicated in FIG. 6, when transmission is completed, the end node sends the tracking information back to the originator. The originator then receives the information and performs measurements or tracking analysis. FIG. 7 illustrates a method 400 for the originator upon receipt of the tracking information. Here the originating node receives 402 the final data packet 250, as illustrated in FIG. 4, with the tracking information. The final data packet 250 is different from the original data packet 250 as the final data packet includes a compilation of timestamps for each tracking node on the transmission data path of MPLS network 22. The tracking information may include other information, such as parameters related to transmission, as designated by the designer of the tracking method or MPLS network 22. A variety of tracking methods will use or include timestamp information as this provides significant information related to delay, jitter and other parameters specified in an SLA. Additionally, by analyzing the cumulative information for a variety of data transmission paths, the service provider may identify traffic patterns or congestion that occurs at certain time of day or for specific types of communications. This may include communications related to a specific content source or server. In one embodiment the timestamp information includes data and time information. In another embodiment, the timestamp information is relative within the network, where tracking nodes are synchronized to a same clock source (not shown).

Returning to FIG. 7, in the present example, on completion of the data transmission, the originator receives 402 the data packet 250 including a compilation of timestamps for each hop in the transmission data path. The originating node extracts 404 the tracking information from the data packet 250. The originating node may then analyze 406 the transmission data path against a tracking criteria. For example, the tracking criteria may relate to a delay specification in the SLA. The tracking methods discussed herein provide a variety of accurate, efficient measures of the hop-by-hop transmission of a data packet, and such information has a plethora of applications, which may be generally applied or specific to the service provider. The tracking methods described herein provide the measurement techniques and are intended to provide information without limit to the later analysis and use of such information. Additionally, for clarity and understanding, the present example relates to timestamp information used to measure the performance of the transmission; however, these methods are applicable to other measurements or information added to the data packet on a hop-by-hop basis. Similarly, the tracking methods may be implemented in a legacy system, where some nodes support the tracking method, while other nodes do not. In such systems, the data packet compiles information for each supporting node, while the non-supporting nodes process the transmission without tracking. In some embodiments, the tracking information includes an indication of the node or router where such information was added.

As illustrated in FIG. 7, the originator analyzes 406 the transmission data path against a tracking criteria or guide. Alternate embodiments may implement the analysis in another unit, such as a central processing unit or other off-line editing. Similarly, the information may be stored in a database for later processing over a period of time or in comparison to other networks. The method 400 then determines if optimization is to be implemented 408 based on analysis of the transmission data path. This may be indicated when the transmission data path performance violates a criteria, or when a fault node is identified. When optimization is indicated, the process changes 410 transmission control according to the transmission policy for processing a future transmission packet. The transmission policy considers global or network related policies for balancing transmissions within the network. The transmission control refers to the specific transmission instructions for services offered by the service provider. Therefore, if a fault location is identified by the tracking information, the traffic control may alter the anticipated routes for future transmissions. Any of a variety of techniques may be implemented to enable the service provider to ensure compliance with SLAs.

Figure 8:
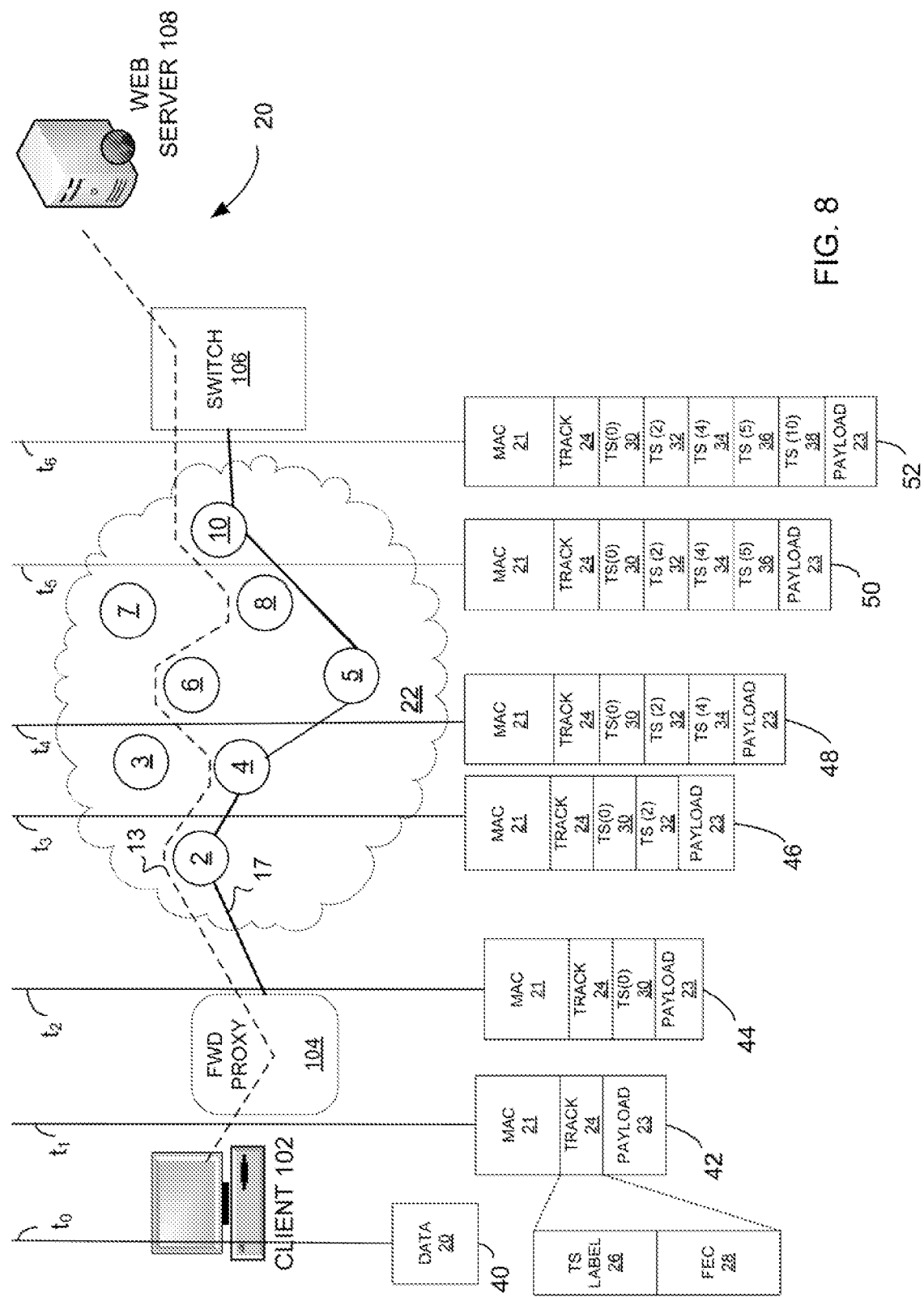
FIG. 8 is a block diagram illustrating a communication network, according to an example embodiment.

FIG. 8 illustrates an example embodiment of a tracking method applied to a communication in the system 20 and traversing the MPLS network 22. The communication path for this communication is different from that of the communication illustrated in FIG. 2, having the first path 13 (dashed line) from node 2 to node 4 to node 6 to node 8 to node 10, and having the second path 17 (solid line) from node 2 to node 4 to node 5 to node 10. The configuration of system 10 is as in FIG. 2, and includes the LSR nodes 2, 3, 4, 5, 6, 7, 8 and 10. The first path 13 is the anticipated path, while the second path 17 is the actual transmission path for the communication. The communication involves transmission of a data packet (not shown). Various times are identified to track transmission of the data packet throughout system 20, and traversing network 22. Each time point (t) identifies a processing time in the transmission at locations within the system 20. There is no scale provided for the time intervals between time points, but rather, they are illustrated for clarity with respect to the respective processing node.

As illustrated in FIG. 8, at a time t0 the client machine 102 receives data from a content source (not shown). The data 20 is prepared for transmission at client machine 102 and is send to the forward proxy 104 at time t1. The data 20 sent is prepared and sent as packet 42. The client machine 102 sends the data 20 within payload 23, and adds the MAC header 21 and the tracking information 24. The tracking information is identified as "TRACK 24." In one embodiment, the tracking information includes a timestamp label TS LABEL 26, and an FEC portion, FEC 28, as illustrated. Alternate embodiments may include a destination label and other optimization is indicated, the process changes 410 transmission control according to the transmission policy for processing a future transmission packet. The transmission policy considers global or network related policies for balancing transmissions within the network. The transmission control refers to the specific transmission instructions for services offered by the service provider. Therefore, if a fault location is identified by the tracking information, the transmission control may alter the anticipated routes for future transmissions. Any of a variety of techniques may be implemented to enable the service provider to ensure compliance with SLAs.

Figure 9:
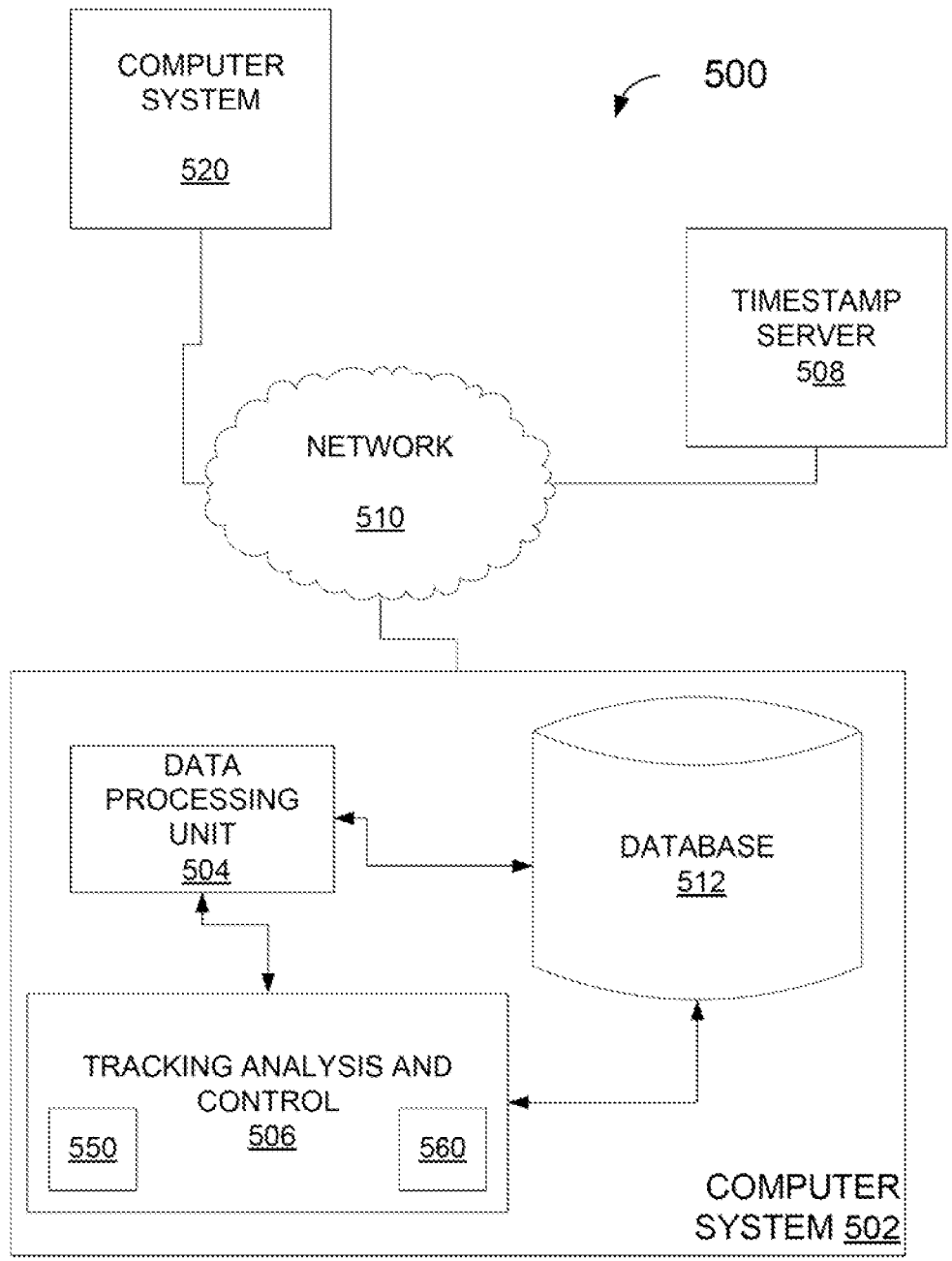
FIG. 9 is a block diagram illustrating a communication network, according to an example embodiment.

An operating system 500 for implementing the tracking methods described herein is illustrated in FIG. 9. The operating system 500 includes a computer system 502 that communicates through network 510 with a computer system 520 and a timestamp server 508. The computer system 502 includes a data processing unit 504 to instruct and control the imposition and extraction of timestamps as well as to analyze the cumulative timestamp information. The computer system 502 further includes a database 512 for storing information related to tracking, including the timestamp information as well as tracking policy information for comparison to the actual hop-by-hop timestamp information. The tracking and analysis control 506 includes code for instructions to analyze the timestamp information.

The tracking and analysis control 506 includes a memory unit to store instructions to analyze timestamp information and an analysis unit 560 to analyze a traversed data path against tracking criteria. The results of the analysis are provided to data processing unit 504 and may be stored in database 512. Additionally, the tracking and analysis control 506 provides control instructions for building the data packets to add the tracking indicator and the timestamp.

Figure 10:
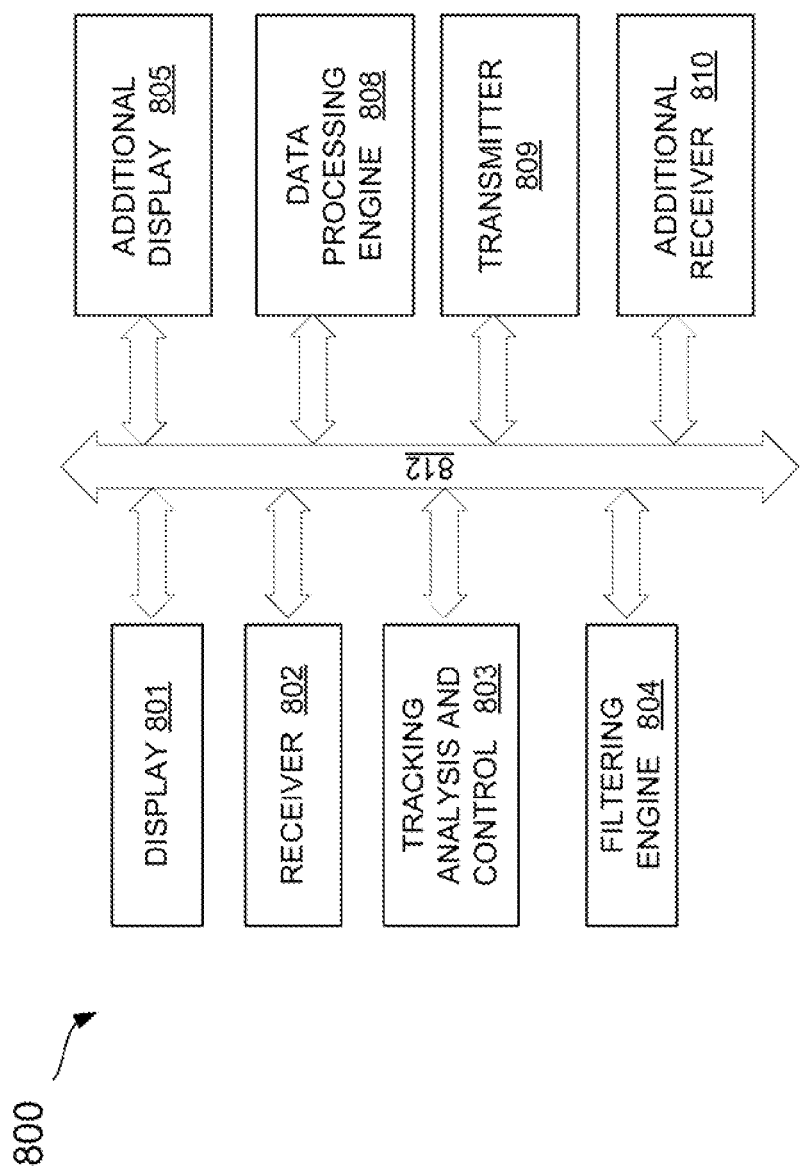
FIG. 10 is a block diagram illustrating a computer system implementing criteria tracking, according to an example embodiment.

The computer system 502 of FIG. 9 is further illustrated in another embodiment as in FIG. 10. The system 800 includes a communication bus 812 for communicatively coupling various units and modules. The system 800 includes a display unit 801 for providing analysis information and allowing a user to set or identify nodes that support timestamp FEC or other tracking methods, as described herein. The system 800 further includes a receiver 802 to receive transmission data packets as well as signaling information, a tracking analysis and control unit 803, a filtering engine 804 and a transmitter 809. The system 800 also includes an additional display 805, a data processing engine 808, and an additional receiver 810. Various tracking methods and techniques, as well as various analysis techniques, may be implemented using the elements present in the system 800. The system 800 may be part of a router or other data packet processing equipment in a communication network. Additionally, the system 800 may be implemented within a stand-alone or mobile device used as part of a communication network, such as in a peer-to-peer connection or other ad hoc network. The system 800 may further include memory storage unit(s) (not shown) for storing information that is used for historical analysis. Such analysis may be done within the system 800 or may be provided to another computing device for analysis.

Figure 11:
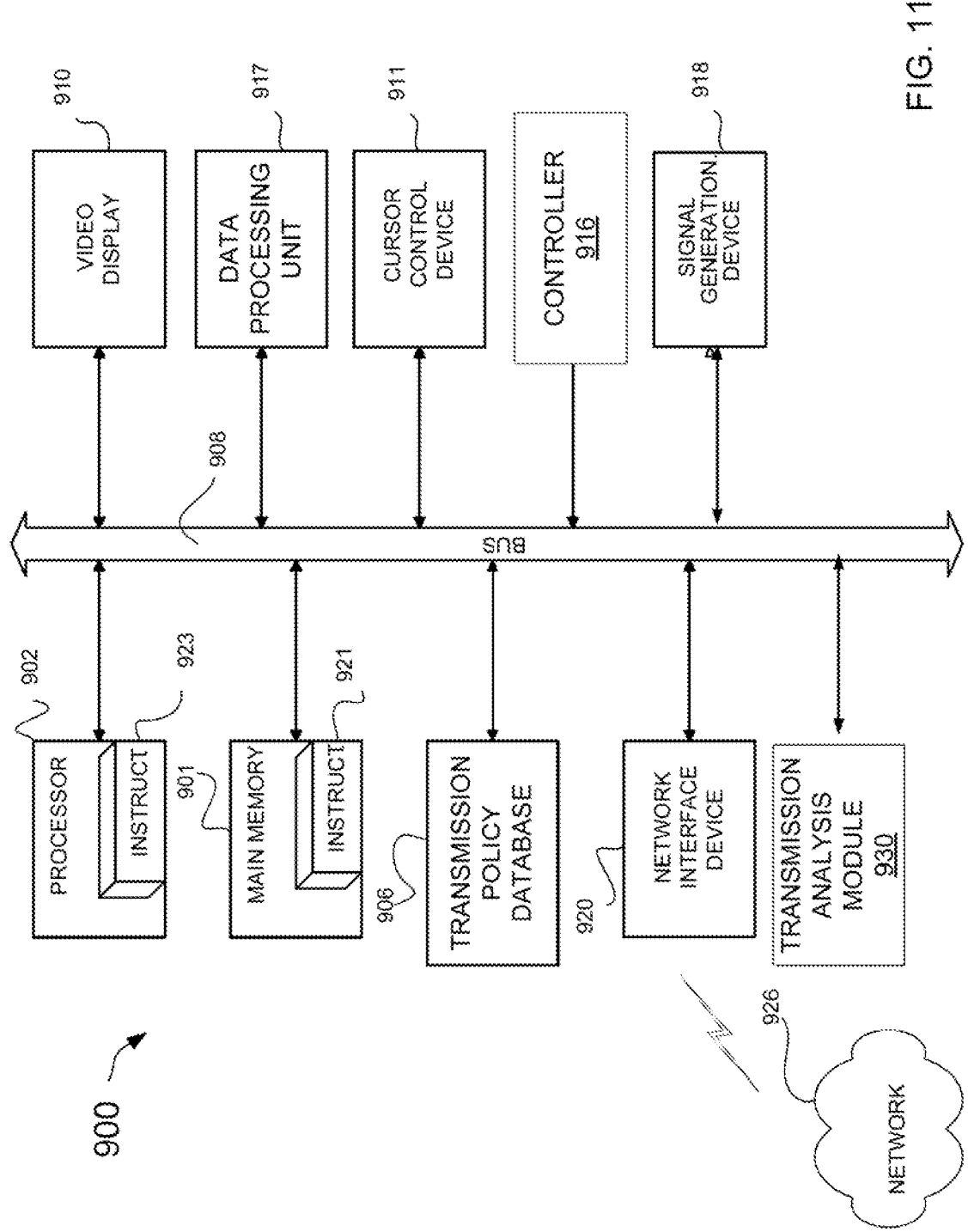
FIG. 11 is a block diagram illustrating a computer network, according to an example embodiment.

FIG. 11 illustrates a computer system 900 for implementing data processing, according to one example embodiment, which supports a tracking method consistent with the measurement and analysis techniques described herein. Computer system 900 may implement the system 800 of FIG. 10 in addition to having further communication and computing capabilities. The computer system 900 is adapted for communication through a network 926, such as the Internet, or directly with other computing devices.

The computer system 900 includes a display module 910, a network interface device 920, which facilitates transmit and receive capabilities, and a main memory storage unit 901, communicating through a communication bus 908. The main memory storage unit 901 includes a portion for storing instructions 921 for enabling functions within computer system 900. In some example embodiments, the main memory storage unit 901 includes, or accesses, a database of information (not shown), which incorporates a machine-readable medium with tangible volatile and/or non-volatile media (e.g., Read Only Memory (ROM), Random Access Memory (RAM), magnetic disk storage media, optical storage media, flash memory devices, and so forth). The main memory storage unit 901 may store archived electronic content generated by the computer system 900.

The computer system 900 further includes a transmission policy database 906 to store policy rules, criteria, and other information to implement a transmission policy for communication. The computer system 900 further includes a transmission analysis module 930 for receiving the measurement information from the tracking method and evaluating such information.

A video display 910 provides instructions for display to a user of computer system 900. While the controller 916 and the transmission policy database 906 are shown as being in a same computer system 900, embodiments are not so limited. The controller 916 and the transmission policy database 906 may be on separate systems. The computer system 900 includes a processor 902, a cursor control device 911, and a signal generation device 918. The controller 916 may be software, hardware, firmware or a combination thereof for executing the various operations described herein, according to some example embodiments. The processor 902 includes instructions 923 for implementing operations within computer system 900 and for communication with network 926. In one embodiment, computer system 900 may implement an LSR having tracking capabilities, wherein the tracking may be implemented by instruction 923, instruction 921, information from transmission policy database, or otherwise. For example, the computer system 900 may receive signaling instructions for capturing timestamp information, which is then sent back to a central repository (not shown). Further, computer system 900 may implement an ingress LSR or an egress LSR.

Additionally, within computer system 900 is a data processing unit 917, which may be resident in memory storage (not shown) within computer system 900. Data processing unit 917 operations may further include operations performed from external to computer system 900, and accessible by controller 916 and main memory 901. The data processing unit 917 may include a document processing application that receives instructions from a user to process a document or other digital data and in response, processes the data.

While the system 900 shown in FIG. 11 employs a client-server architecture, embodiments are not limited to such an architecture, and could equally well find application in a distributed, or peer-to-peer, architecture system. The network communication may occur as part of any combination of wired and wireless communication. In some embodiments, network communication may be based on one or more communication protocols (e.g., HyperText Transfer Protocol (HTTP), HTTP Secured (HTTPS), Real Time Messaging Protocol (RTMP), Real Time Messaging Protocol Secured/SSL (RTMPS), etc.).

Measurements and fault point identification may be enabled by implementing timestamping in the data plane. Data plane measurements refer to measuring the traffic at each router point along the route. The data plane measurements are made on a "hop-by-hop" basis, where a hop refers to transmission of data from one node in the network to another node. Typically, the nodes will be routers, but may refer to any traffic processing point in the network.

Data plane measurements allow the service provider to monitor the data path, or traffic route, along an actual MPLS LSP to accurately identify or predict fault point(s). In an example embodiment, a tracking method collects timestamps across the MPLS path, or LSP, hop-by-hop from an originating point of the LSP to an end-point of the LSP. The timestamp information is then used to determine a point of congestion in the path of the given MPLS LSP. By introducing a tracking indicator in the data packet, each network node supporting the tracking method, referred to as a tracking node, responds to the tracking indicator by adding a timestamp identifying the time of arrival for the data packet at the node. In one embodiment, the tracking node determines if the next node in the MPLS LSP is a tracking node.

In an example embodiment, the tracking indicator may be a label for a Forward Equivalency Class (FEC), such as "timestamp FEC," which is negotiated across the MPLS network. When an MPLS router, such as a tracking node, wants to implement the "timestamp FEC," the tracking node will inform an upstream MPLS router of its tracking capability. The tracking node may provide the tracking capability information through signaling, such as at system startup time. In operation, when a router wants to initiate a tracking request, such as a timestamp collection request, for a target LSP, the router checks whether the next downstream router is a tracking node (and may thus support this capability). If the tracking capability is supported, then the router will add the tracking indicator, such as a "timestamp label," on top of the target LSP envelope and send the packet to the downstream router. Similarly, on receipt of the data packet, the downstream router will add a timestamp to the packet in response to a top label having the tracking indicator. On final delivery to an end point of the LSP, the last tracking node will send the collected timestamp information to the initiating router. In one embodiment, when the next hop downstream router does not support tracking capability, the last tracking node is able to send the collected timestamp information back to the originating or initiating router. In an alternate embodiment, tracking processing terminates, but the data packet continues on through the network. The various embodiments may be implemented in combination, such as where control plane and data plane measurements are used to provide comparative information. In this way, the service provider is able to analyze differences in actual and anticipated traffic paths.

Various embodiments apply information in the control plane and data plane, wherein the tracking indicator may also be applied in the data plane, such as in the hardware data path, to avoid out-of-band issues. These embodiments implement a tracking method which applies a tracking indicator or label to data packets; the tracking indicator alerts a receiving node that tracking is enabled and the receiving node is to collect a timestamp for the MPLS path. The timestamp information provides a way to monitor SLA quality for a given MPLS path. Such a method is implemented within a system having tracking nodes as well as nodes that do not support the tracking method, but avoids the need for any deep packet inspection. A traditional router may be modified to implement a tracking method in the data plane with a very slight modification by adding the functionality to identify a tracking indicator and add timestamp information to a data packet.

Operations, according to some example embodiments, are now described. In certain embodiments, the operations are performed when instructions residing on machine-readable media (e.g., software) are executed, while in other embodiments, the methods are performed by hardware or other logic (e.g., digital logic).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "Software as a Service" (SaaS). For example, at least some of the operations may be performed by a group of computers (as examples of machines including processors), with these operations being accessible via a network (e.g., the Internet) and via one or more appropriate interfaces (e.g., Application Program Interfaces (APIs).)

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer implemented method comprising:
using at least one digital processing unit;
receiving a data packet at a router, the data packet including a tracking indicator, a tracking portion, and a payload;
extracting the tracking indicator from the data packet and identifying the router as supporting hop by hop tracking;
adding a timestamp to the tracking portion to form an amended data packet;
identifying a next node in a transmission path as not supporting hop by hop tracking, the transmission path including the router among other nodes;
revising the transmission path responsive to the identifying the next node as not supporting hop by hop tracking, the revising the transmission path including generating a revised transmission path including nodes that support hop by hop tracking including the router and the next router;
transmitting the amended data packet with the added timestamp to the next router.

2. The method of claim 1, wherein the tracking indicator is a timestamp label in a multiprotocol label system network.

3. The method of claim 2, wherein the next router is a last router on a transmission path, and wherein the method further comprises transmitting, by the next router, the amended data packet with the added timestamp to an originating router.

4. The method of claim 1, further comprising:
identifying the transmission path based on a transmission policy, and wherein the transmission policy specifies a latency of transmissions on a hop-by-hop basis.

5. The method of claim 1, further comprising:
identifying the transmission path based on a transmission policy, and wherein the transmission policy specifies a jitter range for transmission of a service.

6. The method of claim 1, wherein the tracking portion includes at least one instruction that identifies a first tracking mechanism from a plurality of tracking mechanisms, wherein the first tracking mechanism includes timestamp forward equivalency tracking.

7. An apparatus, comprising:
a receiver for receiving a data packet at a router, the data packet includes a tracking indicator, a tracking portion, and a payload;
a data processing unit to extract a tracking indicator from the data packet, identify the router as supporting hop by hop tracking, add a timestamp to the tracking portion to form an amended data packet, identify a next node in a transmission path as not supporting hop by hop tracking, the transmission path includes nodes the router among other nodes, the data processing unit to revise the transmission path responsive to the identification of the next node as not supporting hop by hop tracking, the revised transmission path that includes nodes that supports hop by hop tracking that include the router and the next router;
a transmitter to transmit the amended data packet with the added timestamp to the next router.

8. The apparatus of claim 7, wherein the tracking indicator comprises a memory unit to store instructions to analyze timestamp information and to compare the timestamp information to a transmission policy.

9. The apparatus of claim 7, wherein the apparatus is a router in a multiprotocol label system network.

10. The apparatus of claim 7, wherein the tracking indicator is a timestamp label of a forward equivalency class.

11. The apparatus of claim 10, wherein the data processing unit is further to identify a probe packet for application of the timestamp label.

12. The apparatus of claim 7, wherein the receiver is to receive a timestamp value from a timestamp server.

13. A non-transitory computer-readable storage medium comprising instructions, which cause at least one computing device to:
receive a data payload at a router from over a network;
identify the data payload for hop-by-hop tracking;
create a tracking indicator for the data payload, the tracking indicator allowing hop-by-hop tracking of a transmission path used in transmitting the data payload;
add the tracking indicator to the data payload to form a data packet;
identify a next node in the transmission path as not supporting hop by hop tracking~the transmission path includes the router among other nodes:
revise the transmission path responsive to the identification of the next node as not supporting hop by hop tracking, the revision of the transmission path including a generation of a revised transmission path that includes nodes that support hop by hop tracking that includes the router and the next router; and
transmit the data packet to the next router.

14. The computer-readable storage medium of claim 13, wherein the wherein the at least one computing device is to:
transmit the data packet to originating router when the next router does not support hop-by-hop tracking.

15. The computer-readable storage medium of claim 14, wherein the wherein the at least one computing device is to:
terminate transmission of the data packet on the transmission path.

16. The computer-readable storage medium of claim 14, wherein the at least once computing device is to compare the timestamp information to a transmission policy to identify whether a criterion is violated.

17. The computer-readable storage medium of claim 16, wherein the at least once computing device is to determine whether optimization is to be implemented based on the analysis of the revised transmission path.

18. The computer-readable storage medium of claim 17, wherein the at least once computing device is to alter anticipated routes for future transmission based on a transmission policy, wherein the alteration is responsive to the determination of the implementation of optimization.

19. The computer-readable storage medium of claim 18, wherein the transmission policy includes a global policy for balancing transmissions within the network.

20. The computer-readable storage medium of claim 19, wherein the transmission policy includes a local policy for balancing transmissions within the network.

\* \* \* \* \*